United States Patent
Oddsen et al.

(10) Patent No.: US 7,001,636 B1
(45) Date of Patent: *Feb. 21, 2006

(54) METHOD FOR MANUFACTURING FEED PELLETS AND A PLANT FOR USE IN THE IMPLEMENTATION OF THE METHOD

(75) Inventors: Odd Geir Oddsen, Algard (NO); Harald Skjorshammer, Bryne (NO); Fred Hirth Thorsen, Hundvag (NO)

(73) Assignee: Nutreco Aquaculture Research Centre AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/937,172

(22) PCT Filed: Mar. 17, 2000

(86) PCT No.: PCT/NO00/00093

§ 371 (c)(1),
(2), (4) Date: Dec. 5, 2001

(87) PCT Pub. No.: WO00/57718

PCT Pub. Date: Oct. 5, 2000

(30) Foreign Application Priority Data

Mar. 25, 1999 (NO) .................................. 19991447

(51) Int. Cl.
*A23B 4/03* (2006.01)
*A23L 1/18* (2006.01)

(52) U.S. Cl. ....................... 426/438; 426/448; 426/516; 426/805; 426/231

(58) Field of Classification Search ................ 426/438, 426/448, 516, 805, 231
See application file for complete search history.

(56) References Cited

U.S. PATENT DOCUMENTS

| 4,060,645 A | 11/1977 | Risler et al. |
| 4,154,864 A | 5/1979 | Risler et al. |
| 4,741,904 A | 5/1988 | Smith et al. .................... 426/1 |
| 4,844,927 A | 7/1989 | Morris, II et al. .......... 426/307 |
| 4,917,904 A | 4/1990 | Wakameda et al. ............ 426/7 |
| 4,971,820 A * | 11/1990 | Likuski et al. ............... 426/281 |
| 4,981,711 A | 1/1991 | Kearns et al. .................. 426/1 |

(Continued)

FOREIGN PATENT DOCUMENTS

AU          596359 B2     11/1987

(Continued)

OTHER PUBLICATIONS

JP Abstract of Application No.: 09/182561.

(Continued)

*Primary Examiner*—N. Bhat
(74) *Attorney, Agent, or Firm*—Vidas, Arrëtt & Steinkraus, P.A.

(57) ABSTRACT

A method for manufacturing feed pellets, and a plant for the implementation of this method have been explained. The aim has been to improve the manufacturing of porous pellets, first and foremost to achieve a better control of the porosity of the pellets than the known techniques. The pellets come from a pelletizing machine (1) into a pellet chamber (3) which is kept at a pressure lower than the ambient pressure. From the chamber (3) the pellets are passed through an outlet (5) having a gate lock body (6).

14 Claims, 1 Drawing Sheet

U.S. PATENT DOCUMENTS

| | | | |
|---|---|---|---|
| 5,125,167 A | 6/1992 | Stearns | 34/77 |
| 5,125,168 A | 6/1992 | Aigeldinger | |
| 5,518,742 A | 5/1996 | Soeda et al. | 426/63 |
| 5,527,553 A | 6/1996 | Kazemzadeh | 426/302 |
| 5,587,193 A | 12/1996 | Kazemzadeh | 426/448 |
| 5,658,605 A | 8/1997 | Soeda et al. | 426/7 |
| 5,700,510 A | 12/1997 | Hauck | 426/516 |
| 5,770,253 A * | 6/1998 | Ladstein et al. | 426/604 |
| 5,783,240 A * | 7/1998 | Wenger et al. | 426/231 |
| 5,863,586 A * | 1/1999 | Johnsen et al. | 426/438 |
| 6,136,353 A * | 10/2000 | Munz | 426/281 |
| 6,399,117 B1 * | 6/2002 | Hoff et al. | 426/2 |
| 6,440,477 B1 * | 8/2002 | Nishioka et al. | 426/438 |

FOREIGN PATENT DOCUMENTS

| | | |
|---|---|---|
| DE | 3306027 A | 8/1984 |
| EP | 0 220 253 B1 | 4/1986 |
| EP | 0 220 253 | 6/1990 |
| EP | 0 220 253 B1 | 6/1990 |
| EP | 0 888 860 | 1/1999 |
| GB | 2 232 573 * | 12/1990 |
| GB | 2241862 | 9/1991 |
| WO | 86/06256 | 11/1986 |
| WO | 86/06256 A1 | 11/1986 |
| WO | 93/14645 | 8/1993 |
| WO | 95/03711 | 2/1995 |
| WO | 95/07028 * | 3/1995 |
| WO | 98/03080 | 1/1998 |
| WO | 98/16121 | 4/1998 |
| WO | WO 98/49904 | 11/1998 |
| WO | 99/51107 * | 10/1999 |
| WO | 02/24000 A1 * | 3/2002 |

OTHER PUBLICATIONS

JP Abstract for Application No.: 2-138943.
JP Abstract for Application No.: 2-138944.
Japanese Patent Abstract for Application No.: 2-138945.
Japanese Patent Abstract for Application No.: 3-180162.
Japanese Patent Abstract for Application No.: 3-180163.
Japanese Patent Abstract for Application No.: 3-180164.
Japanese Patent Abstract JP6209716-940802.
Japanese Patent Abstract JP58028234-830219.
Japanese Patent Abstract JP6261692-940920.
Japanese Patent Abstract JP58149645-830906.
Japanese Translation JP6261692.
Abstract of : "Modification of food proteins by covalent crosslinking", Dep. of Food Tech., Massye Univ. Palserston North, New Zealand, *Trends in Food Science & Technology*, (1991) 2 (8) 196-200, 44 ref.
Abstract of: "The Usefulness of transglutaminase for food processing", ACS Symp. Ser. (1996), 637 (Biotechnology for Improved Foods and Flavors), 29-38.
Abstract of : "Enzymic crosslinking as a tool for food colloid theology control and interfacial stabilization", Trends in Food Science & Technology, (1997) 8 (10) 334-339, 57 ref., ISSN: 0924-2244.
Abstract of: "The role of covalent cross-linking in the texturizing of muscle protein sols", *Dep. of food sci.,* North Carolina State Univ., Raleigh, NC 27695-7624, USA, Journal of Muscle foods (1995) 6, (2) 125-138, 52 ref.

* cited by examiner

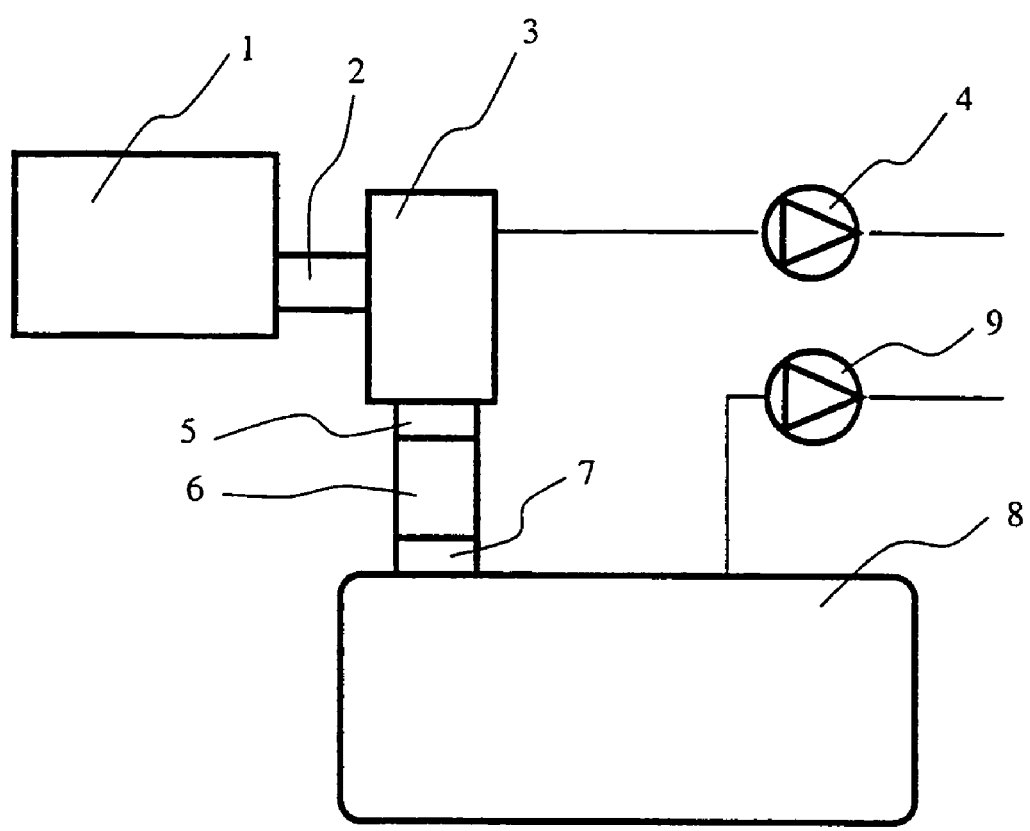

METHOD FOR MANUFACTURING FEED PELLETS AND A PLANT FOR USE IN THE IMPLEMENTATION OF THE METHOD

BACKGROUND OF THE INVENTION

Feed pellets for fish and animals are manufactured on an industrial scale in a multi-stage process. The porosity or specific gravity of completely formed feed pellets or product may be an important criterion for quality of several types of food and feed products, including feed pellets for reared fish. The porosity of the product is of importance to the possibility of adding liquid nutrients which are absorbed into the product; the porosity is further of importance to floating capacities in a suitable medium, and it is of importance to the texture criterions like crispness, mouth sensation and toughness. To pellets of fish feed the porosity is important with respect to the ability of the pellets to absorb oil in the production process, and for the floating capacity/buoyancy in water on feeding.

Existing methods of manufacturing are hard to control accurately, in order for the product to have the desired porosity, or sufficient porosity for the products, feed substances, and/or feed pellets to achieve a desired absorption of fat.

For some products it will be important to be able to control the production process towards a minimum of expansion in, for example pellets, whereas the opposite will be the case for other products. In producing, among other things, feeds for pets such as for example dogs and cats, and feed for reared fish, this possibility of controlling the degree of expansion/porosity is essential, because the aim is often to enable addition of as much fat/oil as possible in a subsequent processing stage for pellets to be fed to fish. For fish feed the control of its degree of expansion is particularly important because such feed should, in addition, exhibit defined sinking capabilities in water after its fat/oil absorption.

GENERAL DESCRIPTION OF THE INVENTION

This invention relates to a method for manufacturing feed pellets, whereby moist feed pellets are subjected to negative pressure followed by a drying process, in order to achieve a more porous pellet and a lower temperature load.

The invention also related to a plant for use in the implementation of the method, the plant generally comprising a pellet chamber, preferably interconnected downstream of a pelletizing machine, an extruding device for pellets or a similar pellet forming device.

An object of the invention is to provide a method and a plant of the initially mentioned kinds, for use in the manufacturing of porous pellets, whereby a better control of the porosity of the feed product is obtained as compared to the known techniques.

Another object is to achieve a lower temperature load on the product through the processing. Since known methods normally require an extra supply of energy, such as heat, to achieve increased expansion, the opposite effect of what was normally to be expected has been achieved by means of the invention. By the use of negative pressure also in the subsequent drying process and possibly a deep-frying process, an essentially lower temperature load can be achieved for the product as compared to conventional methods.

Also, the invention comprises a method whereby the pelletizing is carried out by a first reduced pressure, whereas the subsequent drying is implemented at a second reduced pressure.

BRIEF DESCRIPTION OF THE DRAWING

FIG. 1 is a schematic diagram of a pelletizing machine and pellet chamber.

DETAILED DESCRIPTION OF THE PREFERRED EMBODIMENT

This invention relates to a method for manufacturing feed pellets, whereby moist feed pellets are subjected to negative pressure followed by a drying process, in order to achieve a more porous pellet and a lower temperature load.

The invention also relates to a plant for use in the implementation of the method, the plant generally comprising a pellet chamber, preferably interconnected downstream of a pelletizing machine, an extruding device for pellets or a similar pellet forming device.

Feed pellets for fish and animals are manufactured on an industrial scale in a multi-stage process. The components are mixed to a dough-like body, which is formed into pellets by high pressure and high temperature, for example in a so-called extruder, after which the pellets are dried and cooled. As warm pellets, typically holding 100 to 140° C., are pressure relieved to ambient pressure, the pellets expand because of the release of internal pressure and liquid boils out of the pellets. The expansion results in the pellets having a porous structure.

The pellets are cut into pieces of desired length. Considerable remaining moisture in the expanded pellet is generally undesirable, therefore, the pellets may be dried to obtain a desired level of quality. Such drying may be done in several ways, and some of the methods should be well known to a person skilled in the art.

The porosity or specific gravity of the completely formed product may be an important criterion for quality of several types of food and feed products, including feed pellets for reared fish. The porosity of the product is of importance to the possibility of adding liquid nutrients which are absorbed into the product; the porosity is further of importance to floating capacities in a suitable medium, and it is of importance to the texture criterions like crispness, mouth sensation and toughness. To pellets of fish feed the porosity is important with respect to the ability of the pellets to absorb oil in the production process, and for the floating capacity/buoyancy in water on feeding.

Existing methods of manufacturing are hard to control accurately, in order for the product to have the desired porosity or sufficient porosity for the products, feed substances, and/or feed pellets to achieve a desired absorption of fat.

For some products it will be important to be able to control the production process towards a minimum of expansion in, for example pellets, whereas the opposite will be the case for other products. In producing, among other things, feeds for pets such as for example dogs and cats, and feed for reared fish, this possibility of controlling the degree of expansion/porosity is essential, because the aim is often to enable addition of as much fat/oil as possible in a subsequent processing stage for pellets to be fed to fish. For fish feed the control of its degree of expansion is particularly important because such feed should, in addition, exhibit defined sinking capacities in water after its fat/oil absorption.

The most common method of increasing the porosity is to increase the mechanical and thermal amount of energy added to the raw materials in the extruding stage of the manufacturing process. When the initial mixture contains surplus vapour after extrusion, the surplus vapour will expand and result in greater porosity. It is also possible to supply compressed gas to the extruder, as disclosed in U.S. Pat. No. 5,587,193. In patent publications WO 9503711 and 9816121 are mentioned means for reducing porosity after the extruding stage by extracting positive pressure and surplus vapour inside the extruder. In U.S. Pat. No. 5,527,553 is explained a method, in which the pellets are passed directly into a warm oil bath at 107–232° C. and cut into a desired length in the oil bath. The degree of expansion of pellets is controlled by changing the oil temperature.

An object of the invention is to provide a method and a plant of the initially mentioned kinds, for use in the manufacturing of porous pellets, whereby a better control of the porosity of the feed product is obtained as compared to the known techniques.

Another object is to achieve a lower temperature load on the product through the processing. Since known methods normally require an extra supply of energy, such as heat, to achieve increased expansion, the opposite effect of what was normally to be expected has been achieved by means of the invention. By the use of negative pressure, also in the subsequent drying process, and possibly a deep-frying process, an essentially lower temperature load can be achieved for the product as compared to conventional methods.

In a method of the kind specified initially, this object is realized by proceeding in accordance with the claims, and by a plant of the initially specified kind for the implementation of the method, being formed so that it exhibits the features stated in the claims.

According to the invention the procedure is such that the pellet is produced, discharged by or extruded by a pressure which is lower than the ambient pressure, pellets being transferred, after a relatively short stay by said reduced pressure, to a drying process.

A plant for the implementation of this method comprises a pellet chamber which is interconnected in the plant, downstream of the pelletizing machine, and the plant excels by said pellet chamber being arranged to be able to be kept at a lower pressure than the ambient pressure, for example in the order of 100–800 millibar.

In practice, formation of pellets is normally achieved by extruding pellets in a manner known in itself, but with the important difference of the extruder discharging the pellets into said pellet chamber which works by reduced pressure. The use of reduced pressure will in this connection provide improved cooling, i.e. smaller temperature load on the feed, and increased evaporation of water binding heat. Pellets subjected to reduced pressure will also expand more than usual, and increased evaporation of water contributes to the attainment of a more porous pellet. The expansion may be adjusted by adjusting the negative pressure. Exposure of extruded pellets to low pressure in the pellet chamber may be of a short duration, in typical cases from a few seconds up to one minute, after which the pellets are passed to a drying process.

The pellet temperature generally drops from about 90 to about 50° C. when the pressure (inside the pellet chamber) is reduced from 1000 to 200 millibar. At the same time the pellet becomes more porous after the negative pressure treatment, as the density (less weight per unit of volume) decreases from about 450 to 280 grams per liter of pellets. Pressure lower than 200 millibar may also have a favorable effect on the control of the porosity of the feed pellets.

The table below shows the results obtained in a series of experiments with extruded fish feed by the use of the method and plant according to the invention. The results show a marked increase in the pellet diameter and a reduction in the bulk density as a measurement of expansion when the pressure inside the pellet chamber is reduced from 1000 millibar to 200 millibar. The temperature of the product also decreases by dropping pressure, as a consequence of increased evaporation. The experiment referred to, is only illustrative and not limiting to the scope of the application.

| Absolute pressure (mbar) | Pellet diameter (mm) | Bulk density (g/l) | Temperature of pellets (° C.) | Evaporation of water (g/kg of feed) |
|---|---|---|---|---|
| 1000 | 8.3 | 460 | 91.2 | 5 |
| 800 | 9 | 416 | 80.5 | 6 |
| 600 | 9.1 | 368 | 70.4 | 11 |
| 300 | 10 | 296 | 59.8 | — |
| 200 | 10.2 | 284 | 52 | 15 |

In the experiments mentioned the period of exposure to negative pressure in the pelletizing chamber was 20 seconds. Experiments with continuous discharging from the pellet chamber (i.e. exposure duration of less than 5 seconds), and an exposure duration of 40 seconds, have shown corresponding results for expansion, as those stated above.

A plant for use in the manufacturing of feed pellets excels, according to the invention, by the pellet chamber being arranged to allow itself to be kept at a lower pressure than the ambient pressure, its outlet being connected to an oil tank or a drying plant, to which the pellet is transferred, and wherein the oil tank or the drying plant is also arranged to be able to maintain a lower pressure than that of the surroundings.

It has proved convenient to let the subsequent drying process also be implemented by a pressure which is lower than the ambient pressure. This stage of the method is advantageous in that it favors the attainment of the object aimed at, but this stage may also be eliminated in the implementation of the method to achieve a satisfactory result. The same applied to the deep-frying process which is implemented by reduced pressure in a tank filled with oil, whereby the deep-frying process constitutes said subsequent drying treatment. For the rest, the drying process may be implemented in a known manner, for example by drying in air.

Also, the invention comprises a method whereby the pelletizing is carried out by a first reduced pressure, whereas the subsequent drying is implemented at a second reduced pressure.

Said first pressure and said second pressure may be identical or different from each other.

As mentioned, reduced temperature will be favorable to temperature sensitive components, and increased porosity is favorable to improve the capacity of the pellets to absorb oil, whether the oil is added in connection with the deep-frying, or the oil is added after the pellets have been dried in another way (for example by drying in warm air).

The outlet of the pellet chamber may have a rotatable gate lock body arranged thereto, enabling formed pellets to be drawn continuously or in batches, while, at the same time, the negative pressure is maintained.

According to the invention pellets are produced in a pelletizing machine and passed from the pelletizing machine into said pellet chamber which operates at reduced pressure. The degree of negative pressure relative to the atmospheric pressure is adjusted with a view to the desired expansion of pellets. This method has turned out to provide an essentially better control of the expansion and porosity of the pellets, than measures which have to be taken in a known manner before or during pelletizing. The reason is believed to be that in changing single parameters of the pelletizing process, other parameters are also influenced, which may provide desired results. This is because the pelletizing process creates physical and chemical structures of the raw materials by means of the same measures that control expansion (heat, water and pressure).

One may hypothesize that the same effect as by the invention may be achieved by increasing the pressure during pelletizing, and producing pellets into free air with the same pressure drop as achieved by the invention. However, such a pelletizing pressure increase does not have that effect. Pelletizing will normally occur with pressure variations, in for example the extruding process, exceeding 1 atmosphere (about 1000 millibar), without significantly affecting expansion and porosity. In the production of animal feeds the pressure before pelletizing may be between 15 and 40 atmospheres, depending on the choice of raw materials and desired quality of the final product. Pressure is one, but not the most essential process parameter for adjusting the expansion.

As an explanation of the surprising effect obtained by the application of the invention, a more rapid boiling out of water and subsequent temperature drop are considered to enhance acquisition of a desired level of quality of pellet. The drop in temperature results in the pellet matrix setting, thereby preventing the shrinking effect which is otherwise to be expected.

The pressure within the pellet chamber may be in the pressure range from 0 millibar to below atmospheric pressure, and will in typical cases be between 100 and 800 millibar.

According to the method of the invention, porous pellets are produced in a known manner, but with the novel feature of pellets being discharged into a pellet chamber which is kept at a pressure lower than the ambient pressure, typically in the range from one hundred to eight hundred millibar.

According to the method of the invention, water may be removed from the pellets, and the pores may be filled with fat in subsequent processing stages.

According to the invention the outlet of pelletizing equipment may have a pellet chamber engaged thereto, which is arranged to be maintained at a lower pressure than the surroundings, and which is provided with a gate lock opening so that pellets may be drawn continuously, or in batches, from the pellet chamber, while the chamber is maintained at a reduced pressure.

In the following the invention will be described in further detail by means of the claims, and reference is made to the accompanying drawing, in which the single FIGURE shows a schematic side view of a plant for the manufacturing of pellets.

In the FIGURE of the drawing the reference numeral 1 identifies a pelletizing machine with an outlet 2 which opens into a pellet chamber 3. The pellet chamber 3 has a first vacuum pump 4 arranged thereto, which is arranged to maintain the air pressure inside the pellet chamber 3 at a first desired value, lower than the ambient pressure. At its lower end, the pellet chamber 3 is provided with an outlet 5, in which there is positioned a gate lock device 6, so that the low pressure of the pellet chamber 3 may be maintained while the pellet is discharged. The gate lock device 6 may be of a rotational type, so that pellets may be fed continuously out of the pellet chamber 3.

The outlet 5 is connected to an inlet 7 in the upper part of an oil tank 8 which is partially filled with oil, which is not shown. The oil tank 8 has a second vacuum pump 9 arranged thereto, which is arranged to maintain the air pressure inside the oil tank 8 at a second desired value, which is lower than the ambient pressure and normally also lower than said first desired value of the pellet chamber 3. Further, the oil tank 8 may be provided with a heating element with thermostatic control, possibly an agitator, which is not shown, in order to serve for the deep-frying of pellets.

What is claimed is:

1. A method for manufacturing feed pellets having an initial pore volume and fat content said method comprising:
   A. extruding pellets from a feed material within a pellet extruder having a discharge nozzle;
   B. exposing said extruded pellets to a first pressure lower than ambient pressure immediately subsequent to said extruding step, said exposure to said first pressure occurring in a pellet chamber downstream from said discharge nozzle, whereby said pellets expand and increase said pore volume;
   C. drying said pellets exposed to said pressure; and
   D. subsequently adding oil to said pellets to increase said fat content for said pellets.

2. The method according to claim 1, wherein said adding step occurs during said drying step.

3. The method according to claim 1, wherein said pellets are exposed to said first pressure for a period of time not exceeding one minute, said drying step comprising exposure of said pellets to a second pressure, said second pressure being lower than ambient pressure, said drying step further comprising drying at a temperature below 100 degrees Celsius.

4. The method according to claim 3, wherein said first pressure and said second pressure are different from each other.

5. The method according to claim 1, said drying step comprising an oil bath acting as a deep-frying treatment.

6. A plant for manufacturing feed pellets said plant comprising:
   A. a pelletizing machine constructed and arranged for shaping said pellets;
   B. a pellet chamber adjacent to and downstream from said pelletizing machine, said pellet chamber having an outlet, said pellet chamber being constructed and arranged to expose said pellets to a pressure lower than ambient pressure; and
   C. a tank containing oil, said tank being in communication with said outlet, said tank comprising a deep-frying container, said tank being constructed and arranged to expose said pellets to a second pressure lower than ambient pressure.

7. The plant according to claim 6, wherein said pressure is between 100 and 800 millibars.

8. The plant according to claim 6, wherein said second pressure is between 100 and 800 millibars.

9. The plant according to claim 6, wherein said pressure and said second pressure are different from each other.

10. The plant according to claim 6, further comprising a lock body between said pellet chamber and said tank.

11. The plant according to claim 10, wherein said lock body rotates, said lock body being constructed and arranged to move pellets out of said pellet chamber.

12. The plant according to claim 10, said pellet chamber comprising a first vacuum pump, said first vacuum pump constructed and arranged to maintain said pellet chamber at said pressure lower than said ambient pressure, said tank comprising a second vacuum pump, said second vacuum pump constructed and arranged to maintain said second pressure lower than said ambient pressure.

13. The plant according to claim 12, wherein said second pressure is different from said pressure.

14. The plant according to claim 13, wherein said second pressure is lower than said pressure.

* * * * *